(12) United States Patent
Sakuma et al.

(10) Patent No.: US 12,540,564 B2
(45) Date of Patent: Feb. 3, 2026

(54) EXHAUST TURBINE AND SUPERCHARGER

(71) Applicant: MITSUBISHI HEAVY INDUSTRIES ENGINE & TURBOCHARGER, LTD., Sagamihara (JP)

(72) Inventors: Shigeyoshi Sakuma, Tokyo (JP); Keigo Sakamoto, Tokyo (JP); Eigo Kato, Tokyo (JP); Nobuhito Oka, Sagamihara (JP); Makoto Ozaki, Sagamihara (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 18/840,612

(22) PCT Filed: Feb. 28, 2022

(86) PCT No.: PCT/JP2022/008207
§ 371 (c)(1),
(2) Date: Aug. 22, 2024

(87) PCT Pub. No.: WO2023/162199
PCT Pub. Date: Aug. 31, 2023

(65) Prior Publication Data
US 2025/0198304 A1 Jun. 19, 2025

(51) Int. Cl.
*F01D 25/14* (2006.01)
*F01D 25/16* (2006.01)
*F02B 39/00* (2006.01)

(52) U.S. Cl.
CPC ............ *F01D 25/14* (2013.01); *F01D 25/16* (2013.01); *F02B 39/00* (2013.01);
(Continued)

(58) Field of Classification Search
CPC ...... F01D 25/24; F01D 25/243; F01D 25/246; F02C 6/12
See application file for complete search history.

(56) References Cited

U.S. PATENT DOCUMENTS 4,557,665 A * 12/1985 Szczupak ............... F01D 17/143
417/407
5,087,176 A * 2/1992 Wieland ................ F01D 25/125
417/407
(Continued)

FOREIGN PATENT DOCUMENTS

JP 2007-113501 A 5/2007
JP 2009-167971 A 7/2009
(Continued)

OTHER PUBLICATIONS

International Preliminary Report on Patentability and Written Opinion of the International Searching Authority for International Application No. PCT/JP2022/008207, dated Sep. 12, 2024, with an English translation.
(Continued)

*Primary Examiner* — Courtney D Heinle
*Assistant Examiner* — Cameron A Corday
(74) *Attorney, Agent, or Firm* — BIRCH, STEWART, KOLASCH & BIRCH, LLP

(57) ABSTRACT

An aspect of an exhaust turbine according to the present disclosure is provided with: a rotating shaft; a turbine wheel attached to one end side of the rotating shaft; a turbine housing having a scroll portion formed on an outer peripheral side of the turbine wheel; a bearing housing that accommodates a bearing for supporting the rotating shaft; a fastening member that fastens a first flange portion of the turbine housing and a second flange portion of the bearing housing together; and a heat-shielding plate having an outer peripheral edge portion held between the first flange portion and the second flange portion. In a first cross section that passes through the center of the rotating shaft and a tongue portion of the turbine housing along an axial direction of the rotating shaft, when the innermost position, in a radial direction of the rotating shaft, of a contact surface between (Continued)

the first flange portion and the outer peripheral edge portion of the heat-shielding plate is defined as a first seal inner end, the innermost position, in the radial direction, of a contact surface between the second flange portion and the outer peripheral edge portion of the heat-shielding plate is defined as a second seal inner end, and one of the first seal inner end and the second seal inner end that is positioned outside in the radial direction is defined as a seal inner end, the seal inner end is disposed outside the tongue portion in the radial direction.

12 Claims, 8 Drawing Sheets

(52) U.S. Cl.
CPC ...... *F05D 2220/40* (2013.01); *F05D 2240/50* (2013.01); *F05D 2260/231* (2013.01)

(56) References Cited

U.S. PATENT DOCUMENTS

| | | | |
|---|---|---|---|
| 7,097,432 B1* | 8/2006 | Lombard | F01D 17/143 |
| | | | 415/199.1 |
| 11,118,501 B2* | 9/2021 | Yoshida | F01D 9/048 |
| 2006/0037317 A1* | 2/2006 | Leavesley | F01D 17/167 |
| | | | 60/602 |
| 2007/0089414 A1* | 4/2007 | Yokoyama | F01D 9/026 |
| | | | 60/605.1 |
| 2010/0296925 A1 | 11/2010 | Sakai | |
| 2015/0104303 A1* | 4/2015 | Velthuis | F02C 6/12 |
| | | | 415/220 |
| 2021/0087969 A1 | 3/2021 | Yoshida | |

FOREIGN PATENT DOCUMENTS

| | | |
|---|---|---|
| JP | 2012-117483 A | 6/2012 |
| JP | 2015-521713 A | 7/2015 |
| JP | 2020-118061 A | 8/2020 |
| WO | WO 2015/058839 A1 | 4/2015 |
| WO | WO 2019/087279 A1 | 5/2019 |

OTHER PUBLICATIONS

International Search Report for International Application No. PCT/JP2022/008207, dated May 17, 2022, with English translation.

* cited by examiner

EXHAUST TURBINE AND SUPERCHARGER

TECHNICAL FIELD

The present disclosure relates to an exhaust turbine and a supercharger that includes the exhaust turbine.

BACKGROUND ART

A heat-shielding plate is interposed between a turbine housing of an exhaust turbocharger and a bearing housing, so that an exhaust gas flowing inside the turbine housing is prevented from leaking to the bearing housing side or heat retained in the exhaust gas is prevented from propagating to the bearing housing.

PTLs 1 and 2 disclose a fastening method in which a flange portion formed in a turbine housing and a flange portion formed in a bearing housing are fastened to each other by using a ring-shaped coupling member having a truncated V-shaped cross section, in a state where a heat-shielding plate is interposed between the flange portions formed at an abutment part between the turbine housing and the bearing housing.

CITATION LIST

Patent Literature

[PTL 1] Japanese Unexamined Patent Application Publication No. 2009-167971
[PTL 2] Japanese Unexamined Patent Application Publication No. 2012-117483

SUMMARY OF INVENTION

Technical Problem

In the turbine housing, a tongue portion is formed at a boundary between a scroll passage and an exhaust gas introduction passage, where the exhaust gas flows from the scroll passage into the exhaust gas introduction passage in which a turbine wheel is accommodated, and non-uniform thermal deformation occurs in the vicinity of the tongue portion due to the heat of the exhaust gas. Due to this influence, the flange portion formed at the abutment part between the turbine housing and the bearing housing and the coupling member may be deformed non-uniformly, and thus there is a problem in that sealing performance between the flange portion and the heat-shielding plate cannot be ensured. In addition, there is a problem in that a fastening force of the coupling member becomes non-uniform in a circumferential direction of a rotating shaft or the fastening force is insufficient, so that sealing performance cannot be ensured.

The present invention has been made in view of the above circumstances, and an object of the present invention is to solve the above problems and to ensure sealing performance between a turbine housing and a bearing housing with respect to thermal deformation in the vicinity of a tongue portion due to heat of an exhaust gas.

Solution to Problem

In order to achieve the above object, according to an aspect of the present disclosure, there is provided an exhaust turbine including: a rotating shaft; a turbine wheel mounted on one end side of the rotating shaft; a turbine housing which accommodates the turbine wheel, and in which a scroll portion that introduces an exhaust gas to the turbine wheel is formed on an outer periphery side of the turbine wheel; a bearing housing which accommodates a bearing that supports the rotating shaft, and which is provided adjacent to the turbine housing; a fastening member for fastening a first flange portion of the turbine housing and a second flange portion of the bearing housing to each other; and a heat-shielding plate that is disposed between the turbine housing and the bearing housing and that has an outer peripheral edge portion sandwiched between the first flange portion and the second flange portion, in which in a first cross section along an axis line direction of the rotating shaft, which passes through a center of the rotating shaft and a tongue portion of the turbine housing, in a case where an innermost position in a radial direction of the rotating shaft (hereinafter, simply referred to as a "radial direction") in a contact surface between the first flange portion and the outer peripheral edge portion of the heat-shielding plate is set to be a first seal inner end, an innermost position in the radial direction in a contact surface between the second flange portion and the outer peripheral edge portion of the heat-shielding plate is set to be a second seal inner end, and a seal inner end which is located on an outer side in the radial direction, of the first seal inner end and the second seal inner end, is set to be a seal inner end, the seal inner end is disposed on an outer side with respect to the tongue portion in the radial direction.

Advantageous Effects of Invention

According to aspects of the exhaust turbine and the supercharger according to the present disclosure, even if non-uniform thermal deformation occurs in the vicinity of the tongue portion which is formed in the turbine housing through which an exhaust gas flows, sealing performance of a seal surface which is formed at an abutment part between the turbine housing and the bearing housing and formed between the flange portion and the heat-shielding plate can be maintained at a high level.

DESCRIPTION OF EMBODIMENTS

Figure 1:
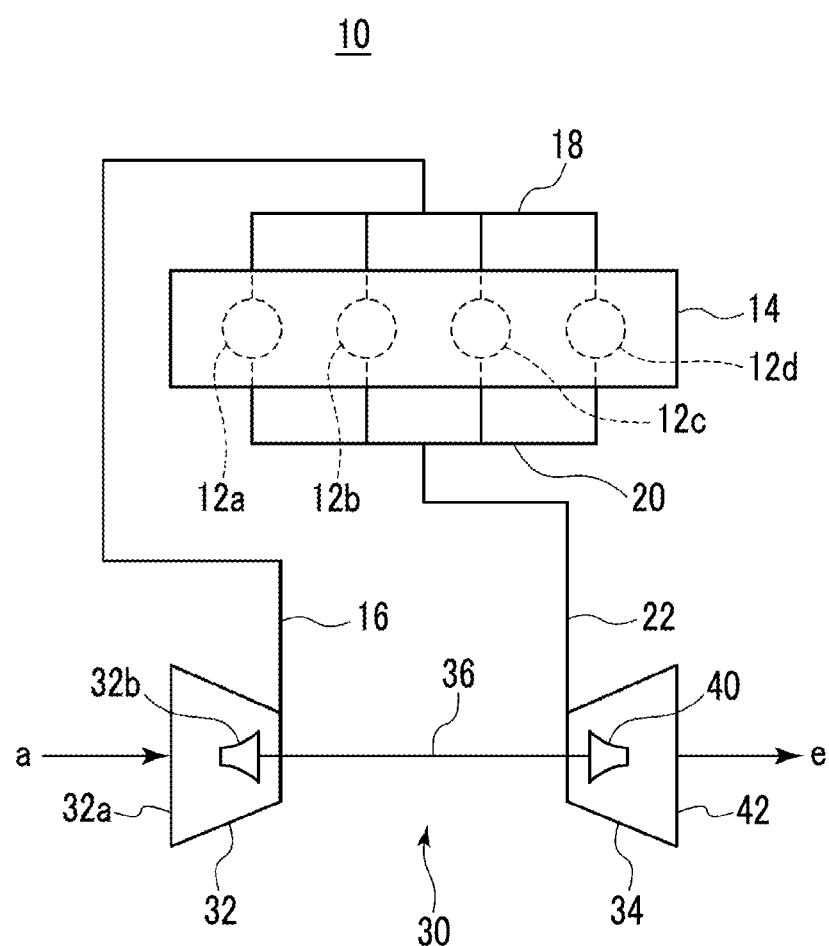
FIG. 1 is a schematic configuration diagram of an engine that includes a supercharger according to an embodiment.

Hereinafter, some embodiments of the present invention will be described with reference to the accompanying drawings. Note that dimensions, materials, shapes, relative arrangements, and the like of components described in the embodiments or shown in the drawings are not intended to limit the scope of the present invention, but are merely exemplary.

For example, an expression indicating a relative disposition or an absolute disposition, such as "in a direction", "along a direction", "parallel", "orthogonal", "center", "concentric", or "coaxial", not only strictly represents such a disposition, but also represents a state of being relatively displaced with a tolerance, or an angle or a distance to the extent that the same function can be obtained.

For example, expressions such as "identical", "equal", and "homogeneous", which indicate that things are in the same state, not only represent a state of being strictly equal, but also represent a state in which there is a tolerance, or a difference to the extent that the same function can be obtained.

For example, an expression indicating a shape such as a square shape or a cylindrical shape not only represents a shape such as a square shape or a cylindrical shape in a geometrically strict sense, but also represents a shape that includes concave and convex portions, chamfered portions, or the like to the extent that the same effects can be obtained.

Meanwhile, the expressions "being provided with", "including", "comprising", "containing", or "having" one component are not exclusive expressions excluding the presence of other components.

Figure 2:
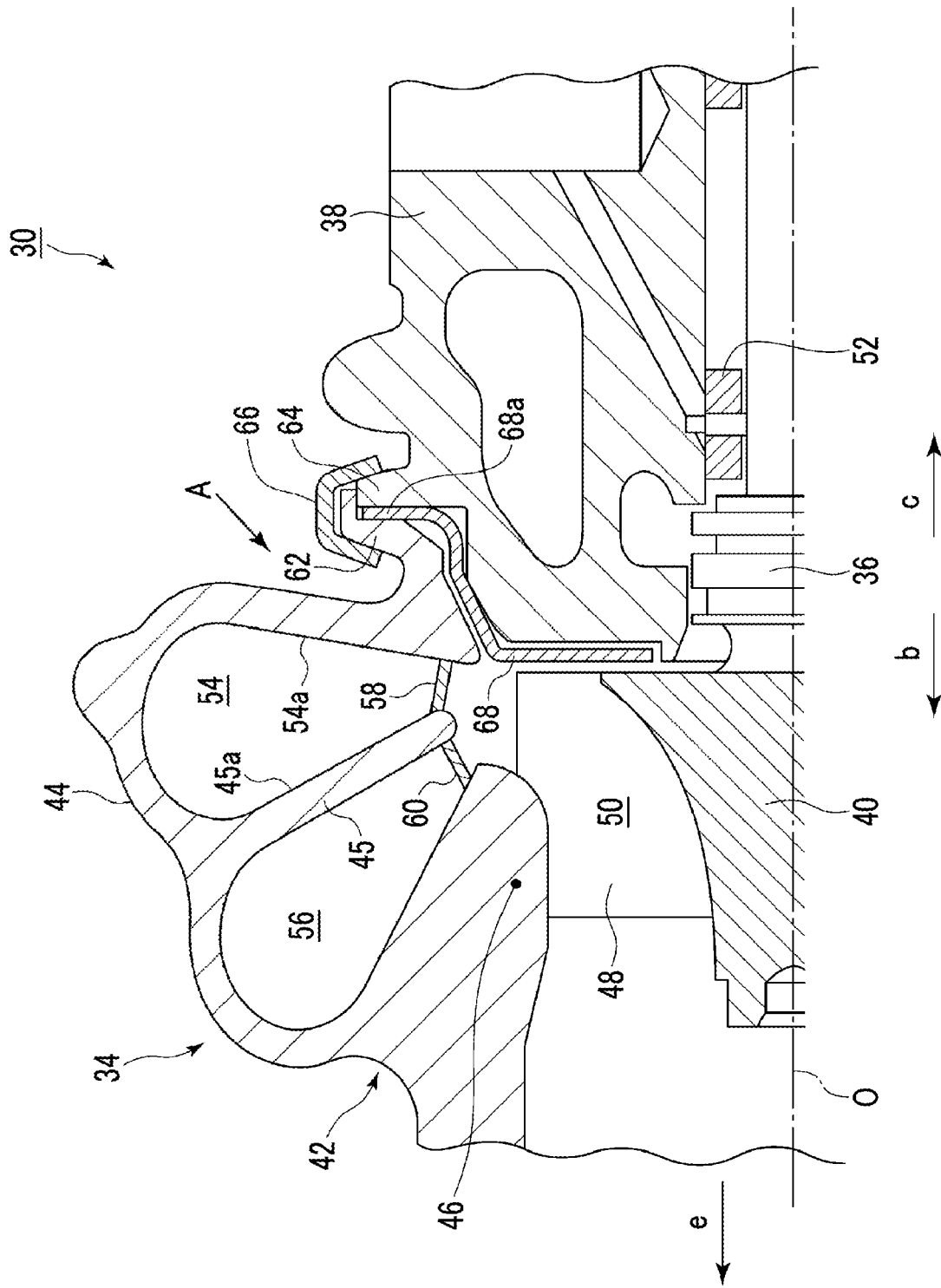
FIG. 2 is a vertical sectional view showing a part of the supercharger according to the embodiment.

FIG. 1 is a schematic configuration diagram of an engine that includes a supercharger according to an embodiment, and FIG. 2 is a vertical sectional view showing a part of the supercharger.

In FIG. 1, an engine 10 that includes a supercharger 30 has, for example, four cylinders 12a, 12b, 12c, and 12d inside an engine main body 14, and compressed air is supplied to the four cylinders via an air supply manifold 18. The compressed air is supplied from a compressor portion 32 that configures a part of the supercharger 30. Air for fuel a is supplied to the compressor portion 32, the air for fuel a is compressed in the compressor portion 32, and the compressed air is supplied to the cylinders 12a to 12d via an air supply pipe 16 and the air supply manifold 18. An exhaust gas e that is discharged from each of the cylinders 12a to 12d is sent to an exhaust turbine portion 34 that configures a part of the supercharger 30 via an exhaust manifold 20 and an exhaust pipe 22, and rotates a turbine wheel 40 accommodated in a turbine housing 42.

As shown in FIG. 2, the supercharger 30 includes the exhaust turbine portion 34 provided on one end side (an end portion side in the direction indicated by an arrow b in FIG. 2) of a rotating shaft 36. The exhaust turbine portion 34 includes the turbine wheel 40 mounted on one end side of the rotating shaft 36, and the turbine housing 42 that accommodates the turbine wheel 40. The compressor portion 32 is provided on the other end side (an end portion side in the direction indicated by an arrow c in FIG. 2) of the rotating shaft 36, and the turbine wheel 40 is connected to a compressor wheel 32b accommodated inside a compressor housing 32a via the rotating shaft 36. The compressor wheel 32b is rotated by the rotation of the turbine wheel 40, and the air for fuel a is sucked into the compressor housing 32a by the rotation of the compressor wheel 32b and compressed by the compressor wheel 32b, and the compressed air is supplied to each of the cylinders 12a to 12d.

As shown in FIG. 2, the turbine housing 42 has a scroll portion 44 formed on an outer periphery side of the turbine wheel 40. The turbine housing 42 includes an exhaust gas introduction portion 46 inside the scroll portion 44. In the interior of the exhaust gas introduction portion 46, a plurality of blades 48 are radially provided along a circumferential direction of the rotating shaft 36 (hereinafter, simply referred to as a "circumferential direction") on an outer peripheral surface of the turbine wheel 40, and an exhaust gas introduction passage 50 is formed between each pair of blades 48. The exhaust gas e flows from a flow path formed in the scroll portion 44 into the exhaust gas introduction passage 50, and then flows out from the exhaust gas introduction passage 50 after rotating the turbine wheel 40.

A bearing housing 38 is provided adjacent to the turbine housing 42 on the other side (a side in the direction indicated by the arrow c in FIG. 2) of the turbine housing 42. A bearing 52 that rotatably supports the rotating shaft 36 is accommodated in the bearing housing 38. The compressor portion 32 is provided on the other side of the bearing housing 38. In FIG. 2, reference sign O indicates a central axis that is a rotation center of the rotating shaft 36.

The supercharger 30 according to the embodiment shown in FIG. 2 is a twin-scroll type supercharger, and two exhaust gas flow paths, a rear-side exhaust gas flow path 54 and a front-side exhaust gas flow path 56, are formed in the scroll portion 44. In this case, the exhaust manifold 20 and the exhaust pipe 22 are divided into two systems, and the exhaust gas flow path formed by the exhaust manifold and the exhaust pipe of one system communicates with the rear-side exhaust gas flow path 54, and the exhaust gas flow path formed by the exhaust manifold and the exhaust pipe of the other system communicates with the front-side exhaust gas flow path 56. In the twin-scroll type, the exhaust gas flow paths are designed to have the same flow capacity for the exhaust gases flowing through the rear-side exhaust gas flow path 54 and the front-side exhaust gas flow path 56 such that a pressure difference does not occur between the pressure of the exhaust gas flowing through the rear-side exhaust gas flow path 54 and the pressure of the exhaust gas flowing through the front-side exhaust gas flow path 56.

In the scroll portion 44, the exhaust gas flow path formed in a spiral shape is gradually narrowed toward a downstream side, so that the exhaust gas flows into the exhaust gas introduction passage 50 in a state where the exhaust gas is accelerated. Each of a rear-side tongue portion 58 and a front-side tongue portion 60 is formed at a portion that is a termination portion (wound portion) of each of the rear-side exhaust gas flow path 54 and the front-side exhaust gas flow path 56 and that is an inlet of the exhaust gas introduction passage 50.

The embodiment shown in FIG. 2 is an embodiment applied to a twin-scroll type supercharger. However, the exhaust turbine according to the present disclosure can also be applied to a single-scroll type supercharger.

In FIG. 2, a first flange portion 62 is formed in the other side end portion (the end portion in the direction indicated by the arrow c in FIG. 2) of the turbine housing 42, and a second flange portion 64 is formed in one side end portion (the end portion in the direction indicated by the arrow b in FIG. 2) of the bearing housing 38. Both of the flange portions 62 and 64 are fastened to each other by a fastening member 66, and thereby the turbine housing 42 and the bearing housing 38 are joined to each other. A heat-shielding plate 68 is disposed between the first flange portion 62 and the second flange portion 64 that are fastened to each other by the fastening member 66. That is, an outer peripheral edge portion 68a of the heat-shielding plate 68 is sandwiched between both of the flange portions 62 and 64.

Figure 3:
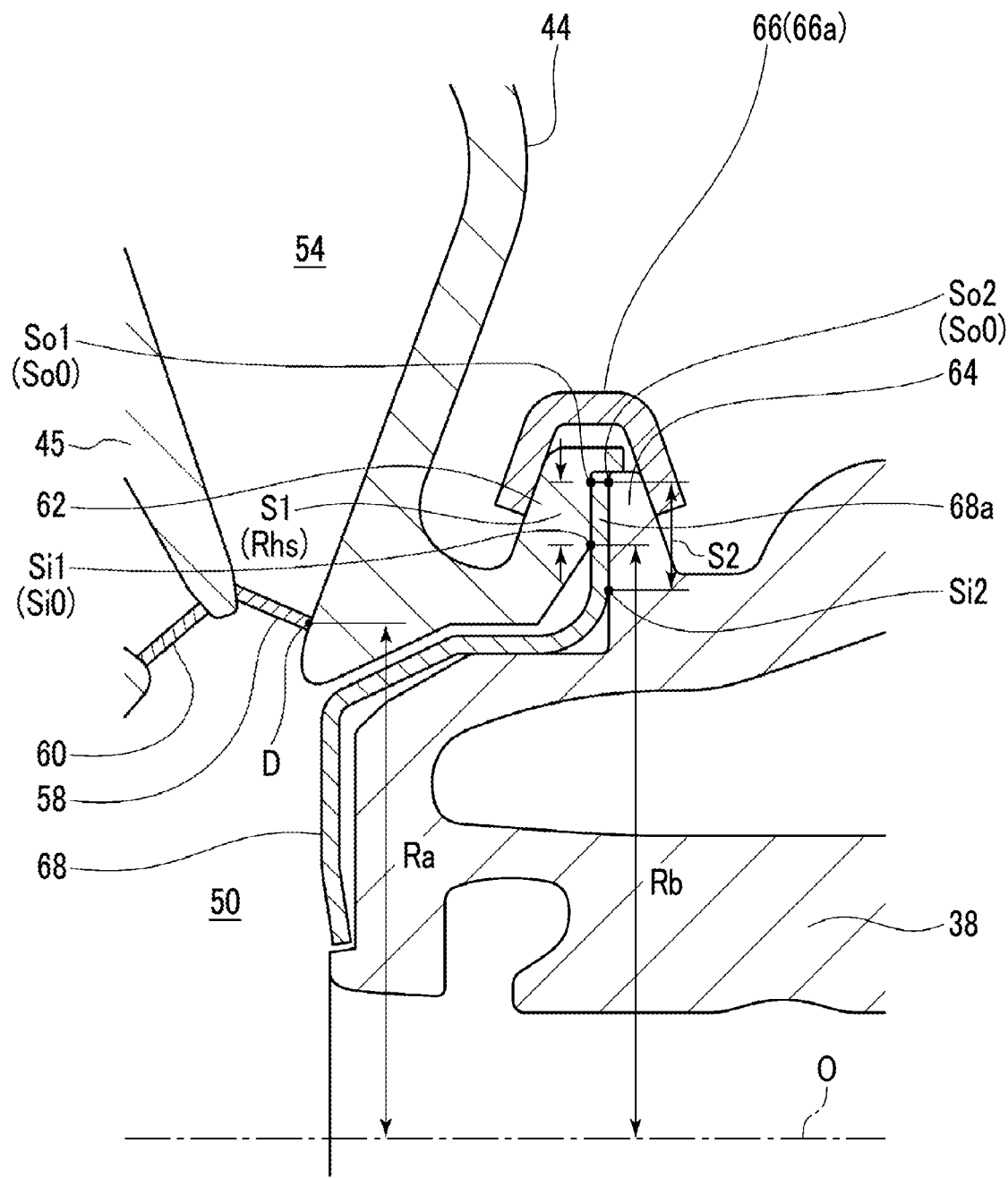
FIG. 3 is a vertical sectional view showing a part of an exhaust turbine portion according to the embodiment in an enlarged manner.

FIG. 3 corresponds to a vertical sectional view in which the vicinity of a portion A in FIG. 2 is further enlarged, and shows an exhaust turbine portion 34a according to one embodiment. That is, FIG. 3 shows a cross section along the axis line direction of the rotating shaft 36 (a direction along the central axis O, hereinafter, simply referred to as an "axis line direction"), which is a cross section (a first cross section) passing through the center (the central axis O) of the rotating shaft 36 and the rear-side tongue portion 58. In addition, in FIG. 3, the illustration of the rotating shaft 36 and the turbine wheel 40 is omitted, and the reference sign O indicates the position of the central axis O of the rotating shaft 36 when the rotating shaft 36 is disposed.

As shown in FIG. 3, the first flange portion 62 and the outer peripheral edge portion 68a of the heat-shielding plate 68 are in contact with each other at a partial region in the radial direction, and a contact surface between the first flange portion 62 and the outer peripheral edge portion 68a of the heat-shielding plate 68 forms a first seal surface S1. Further, on the side opposite to the first seal surface S1 with respect to the outer peripheral edge portion 68a, the second flange portion 64 and the outer peripheral edge portion 68a of the heat-shielding plate 68 are in contact with each other in a partial region in the radial direction, and a contact surface between the second flange portion 64 and the outer peripheral edge portion 68a of the heat-shielding plate 68 form a second seal surface S2. In FIG. 3, a point Si1 indicates an innermost position (a first seal inner end) in the radial direction in the contact surface (the first seal surface S1) between the first flange portion 62 and the outer peripheral edge portion 68a of the heat-shielding plate 68. A point Si2 indicates an innermost position (a second seal inner end) in the radial direction in the contact surface (the second seal surface S2) between the second flange portion 64 and the outer peripheral edge portion 68a of the heat-shielding plate 68. A seal inner end SiC (in the present embodiment, the first seal inner end Si1 corresponds thereto) which is located on a radial outer side, of the first seal inner end Si1 and the second seal inner end Si2, is disposed on the radial outer side with respect to the rear-side tongue portion 58.

The seal inner end SiC is a radial inner end of the region where the seal surfaces S1 and S2 formed on both side surfaces of the outer peripheral edge portion 68a of the heat-shielding plate 68 overlap each other in the radial direction, that is, the region where seal pressure is highest (hereinafter, also referred to as a "high seal pressure region") in the seal surfaces S1 and S2. In FIG. 3, the high seal pressure region is indicated by reference sign Rhs.

In the present embodiment, a radial outer end (a first seal outer end So1 (described later)) of the first seal surface S1 and a radial outer end (a second seal outer end So2 (described later)) of the second seal surface S2 are located at substantially the same position in the radial direction. Therefore, the region between the first seal inner end Si1 and the first seal outer end So1 is the high seal pressure region Rhs.

According to the present embodiment, since the seal inner end SiC (the first seal inner end Si1) is located on the radial outer side with respect to the rear-side tongue portion 58, the high seal pressure region Rhs is located at a position separated radially outward from a portion which is affected by non-uniform thermal deformation of the rear-side tongue portion 58. Accordingly, the seal surfaces S1 and S2 formed on both side surfaces of the outer peripheral edge portion 68a of the heat-shielding plate 68 can be prevented from being affected by the non-uniform thermal deformation of the rear-side tongue portion 58. Therefore, sealing performance of the seal surfaces S1 and S2 can be maintained.

In the present embodiment, the front-side exhaust gas flow path 56 is behind the rear-side exhaust gas flow path 54 with respect to the heat-shielding plate 68, and is at a position separated in the axis line direction from the first flange portion 62 via the rear-side exhaust gas flow path 54. Therefore, the thermal deformation in the vicinity of the front-side tongue portion 60 hardly affects the first flange portion 62. Therefore, in the present embodiment, the thermal deformation of the turbine housing 42 that is generated in the vicinity of the front-side tongue portion 60 is not taken into consideration.

In the embodiment shown in FIG. 3, the rear-side tongue portion 58 is located on the bearing housing 38 side, and the inner end SiC is disposed on the radial outer side with respect to a lower portion D in the vicinity of a partition wall surface (a partition wall surface 54a (described later) of the scroll portion 44 with the lower portion D as a reference for comparison.

The heat-shielding plate 68 has an annular shape and is disposed over the entire region in the circumferential direction so as to surround the turbine wheel 40.

In addition, the configuration according to the present embodiment is applied only to the region in the vicinity of the first cross section where at least the rear-side tongue portion 58 is formed, and does not need to be necessarily applied to the entire region in the circumferential direction.

Figure 4:
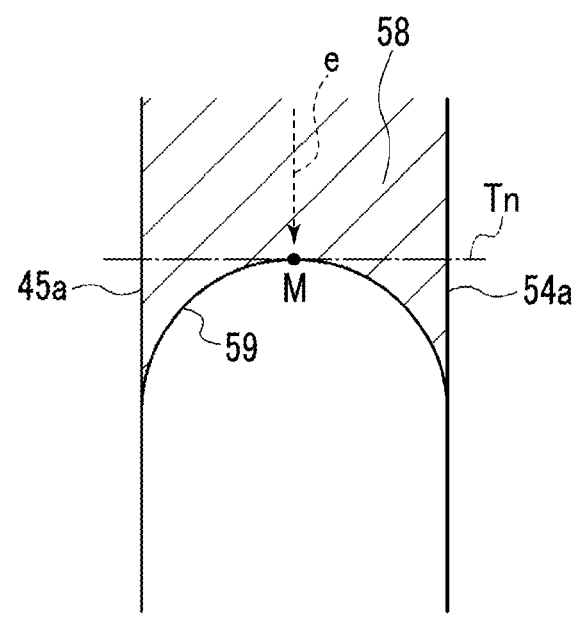
FIG. 4 is a plan view of one configuration example of a tongue portion formed in a turbine housing, as viewed from above.
Figure 5A:
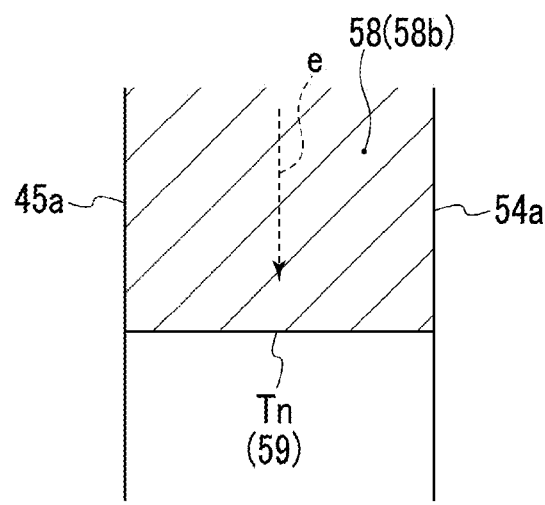
FIG. 5A is a plan view of another configuration example of the tongue portion, as viewed from above.
Figure 5B:
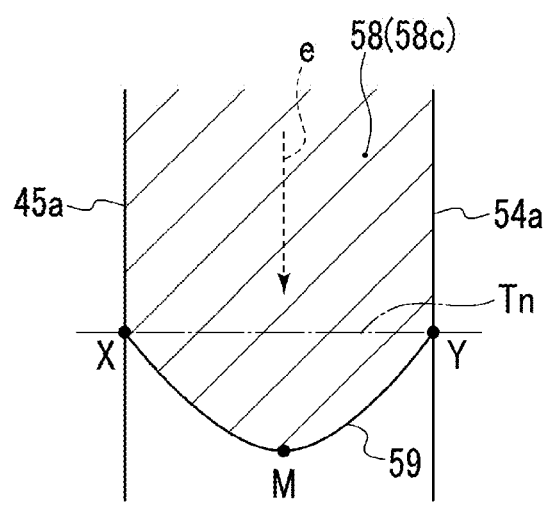
FIG. 5B is a plan view of still another configuration example of the tongue portion, as viewed from above.

FIGS. 4, 5A, and 5B are plan views showing some examples of the shape of the rear-side tongue portion 58, as viewed from an upstream side in a flow direction of the exhaust gas.

In these drawings, reference numeral 54a indicates a partition wall surface located on the other side (the arrow c direction side) among the partition wall surfaces of the scroll portion 44 forming the rear-side exhaust gas flow path 54, and reference numeral 45a indicates a partition wall surface facing the rear-side exhaust gas flow path 54 of a partition wall 45 partitioning the rear-side exhaust gas flow path 54 and the front-side exhaust gas flow path 56. Reference numeral 59 indicates a downstream-side end in the flow direction of the exhaust gas e, and reference sign Tn indicates a reference line that serves as a reference when the position in the radial direction of the rear-side tongue portion 58 is determined. The position of the reference line Tn is determined from the viewpoint of being a portion where heat flux increases when the heat retained in the exhaust gas e is transmitted to the turbine housing 42 via the rear-side tongue portion 58. In the present embodiment, it can be said that a radial position of the rear-side tongue portion 58 is based on the position of the reference line Tn.

In a rear-side tongue portion 58a shown in FIG. 4, the downstream-side end 59 has an arc shape that is located on the most downstream side in the flow direction of the exhaust gas e on both of the partition wall surfaces 45a and 54a and located on the most upstream side at a midpoint (a central portion of the flow) M between both of the partition wall surfaces 45a and 54a, and the reference line Tn is determined to pass through the midpoint M.

In a rear-side tongue portion 58b shown in FIG. 5A, the downstream-side end 59 is located at the same position in an entire width direction of the rear-side exhaust gas flow path 54 with respect to the flow direction of the exhaust gas e, and the reference line Tn is determined to pass through the downstream-side end 59. That is, the downstream-side end 59 coincides with the reference line Tn.

In a rear-side tongue portion 58c shown in FIG. 5B, the downstream-side end 59 has a parabolic shape that is located at points X and Y on the most upstream side in the flow direction of the exhaust gas e on both of the partition wall surfaces 45*a* and 54*a* and located on the most downstream side in the flow direction of the exhaust gas e at the midpoint M, and the reference line Tn is determined to pass through the most upstream side positions (the points X and Y) of the rear-side tongue portion 58*c*. That is, the reference line Tn is a line having a direction orthogonal to the flow direction of the exhaust gas e (the width direction of the rear-side exhaust gas flow path 54), and passes through the most upstream side position in the flow direction of the exhaust gas e of the downstream-side end 59.

Figure 6:
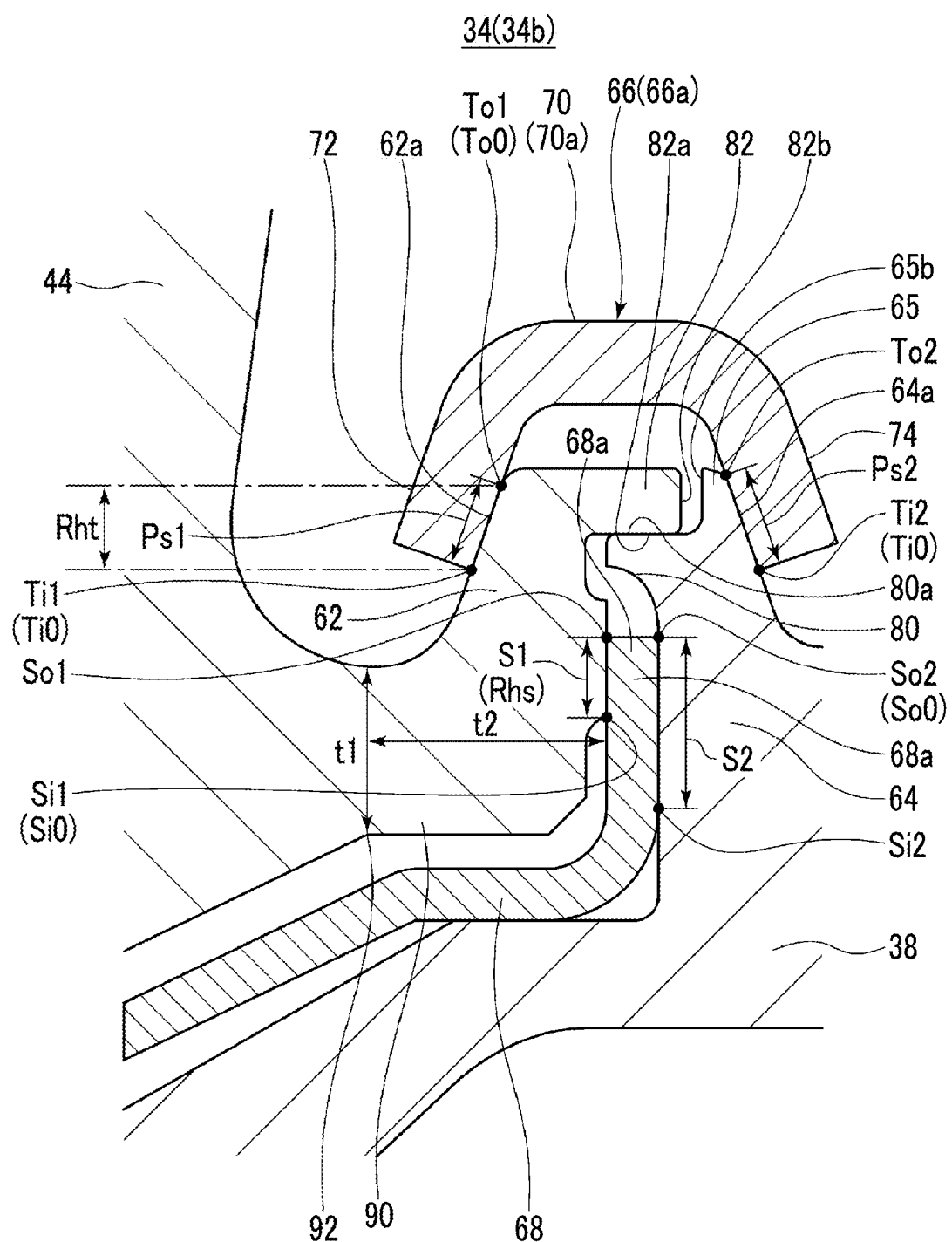
FIG. 6 is a vertical sectional view showing a part of the exhaust turbine portion according to the embodiment in an enlarged manner.

FIG. 6 is a vertical sectional view (the first cross section) showing a part of an exhaust turbine portion 34*b* according to another embodiment in an enlarged manner. In FIG. 6, a fastening member 66*a* according to one embodiment includes a base portion 70 that is disposed on an outer periphery side of the first flange portion 62 and the second flange portion 64, a first fastening portion 72 extending from the base portion 70 toward a radial inner side along a back surface 62*a* of the first flange portion 62, and a second fastening portion 74 extending from the base portion 70 toward the radial inner side along a back surface 64*a* of the second flange portion 64.

In the cross section (the first cross section) shown in FIG. 6, a point So1 indicates an outermost position (a first seal outer end) in the radial direction in the contact surface (the first seal surface S1) between the first flange portion 62 and the outer peripheral edge portion 68*a* of the heat-shielding plate 68. In addition, in the same drawing, a point So2 indicates an outermost position (a second seal outer end) in the radial direction in the contact surface (the second seal surface S2) between the second flange portion 64 and the outer peripheral edge portion 68*a* of the heat-shielding plate 68.

The seal outer end which is located on the inner side in the radial direction, of the first seal outer end So1 and the second seal outer end So2, is set to be a seal outer end So0. In the present embodiment, since the first seal outer end So1 and the second seal outer end So2 are located at substantially the same position in the radial direction, the first seal outer end So1 or the second seal outer end So2 corresponds to the seal outer end So0.

Further, in FIG. 6, reference sign Ti1 indicates an innermost position (a first fastening inner end) in the radial direction in a contact surface (a first pressurization surface Ps1) between the first fastening portion 72 and the back surface 62*a* of the first flange portion 62. Reference sign Ti2 indicates an innermost position (a second fastening inner end) in the radial direction in a contact surface (a second pressurization surface Ps2) between the second fastening portion 74 and the back surface 64*a* of the second flange portion 64.

In a case where the fastening inner end which is located on the outer side in the radial direction, of the first fastening inner end Ti1 and the second fastening inner end Ti2, is set to be a fastening inner end Ti0, the seal outer end SoC is disposed on the radial inner side with respect to the fastening inner end Ti0.

The fastening inner end Ti0 is an inner end of a radial region (hereinafter, also referred to as a "high fastening pressure region") in which the fastening force is applied to the first flange portion 62 and the second flange portion 64 from both the first fastening portion 72 and the second fastening portion 74. In FIG. 6, the high fastening pressure region is indicated by reference sign Rht.

In the embodiment shown in FIG. 6, since the first fastening inner end Ti1 and the second fastening inner end Ti2 are at substantially the same position in the radial direction, the first fastening inner end Ti1 or the second fastening inner end Ti2 is the fastening inner end Ti0. Here, the "same position in the radial direction" means a position where the distance from the central axis O on a straight line orthogonal to the central axis O of the rotating shaft 36 is the same. In addition, since a radial outer end (a first fastening outer end To1 (described later) of the first pressurization surface Ps1 is located on the inner side in the radial direction with respect to a radial outer end (a second fastening outer end To2 (described later)) of the second pressurization surface Ps2, the first pressurization surface Ps1 forms the high fastening pressure region Rht.

According to the present embodiment, the seal outer end So0 (the first seal outer end So1 or the second seal outer end So2, the radial outer end of the high seal pressure region Rhs) is disposed on the radial inner side with respect to the fastening inner end TiC (the inner end of the high fastening pressure region Rht). Therefore, the high seal pressure region Rhs is located at a position separated radially inward from the high fastening pressure region Rht where both of the flange portions 62 and 64 receive the most fastening force from the fastening member 66*a*. Accordingly, even in a case where the fastening force of the fastening member 66*a* is biased in the circumferential direction of both of the flange portions 62 and 64, since the bias in the circumferential direction of the fastening force that is applied to both of the seal surfaces S1 and S2 is mitigated, the sealing performance of these seal surfaces can be ensured.

In one embodiment, the base portion 70 is provided in substantially the entire region in the circumferential direction so as to surround the first flange portion 62 and the second flange portion 64 from the outer periphery side.

In one embodiment, the base portion 70 has a joint (opening) formed in a part thereof in the circumferential direction, and a flange portion (not shown) is provided at each of both end portions of the base portion 70 in the circumferential direction with the joint interposed therebetween. The flange portions protrude to the radial outer side and are disposed to face each other. The flange portions are brought close to each other by a fastening tool such as a bolt, so that the fastening member 66 fastens the first flange portion 62 and the second flange portion 64 to each other.

In one embodiment, the first fastening portion 72 and the second fastening portion 74 of the fastening member 66 do not necessarily need to be provided over the entire circumference in the circumferential direction. The fastening portions may be provided only in the vicinity of the first cross section where at least the rear-side tongue portion 58 is present.

In the embodiment shown in FIG. 6, a base portion 70*a* of the fastening member 66*a* has an extension portion extending linearly along the axis line direction. In addition, the back surface 62*a* of the first flange portion 62 and the back surface 64*a* of the second flange portion 64 are inclined surfaces inclined in a direction in which the back surface 62*a* and the back surface 64*a* are separated from each other toward the radial inner side. The first fastening portion 72 extends toward the radial inner side along the back surface 62*a* of the first flange portion 62, and the second fastening portion 74 extends toward the radial inner side along the back surface 64*a* of the second flange portion 64.

According to this embodiment, the joint (opening) formed in a part of the base portion 70 in the circumferential direction is narrowed by using a fastening tool such as a bolt, so that the first fastening portion 72 slides on the back surface 62*a* of the first flange portion 62 to the radial inner side and the second fastening portion 74 slides on the back surface 64a of the second flange portion 64 to the radial inner side as the diameter of the base portion 70 is reduced. Therefore, a fastening force can be efficiently applied to the first flange portion 62 and the second flange portion 64, and the fastening force of the fastening member 66 can be prevented from becoming non-uniform in the circumferential direction.

Figure 7:
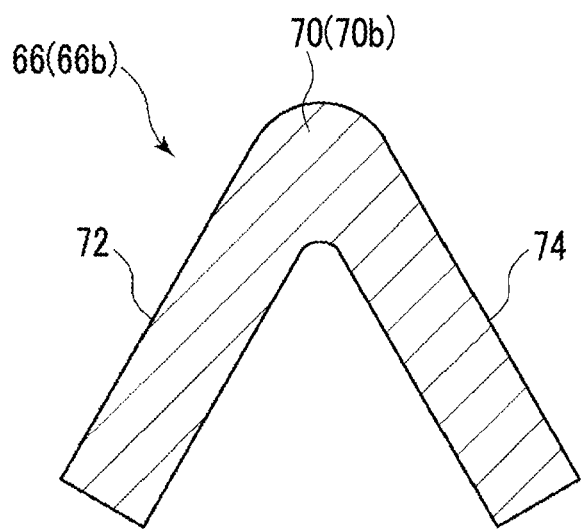
FIG. 7 is a front view of a fastening member according to an embodiment.

In another embodiment, as shown in FIG. 7, a fastening member 66b is used in accordance with the shapes of tip portions of the first flange portion 62 and the second flange portion 64. The fastening member 66b has a base portion 70b that does not have an extension portion along the axis line direction. The fastening member 66b has a V shape as a whole.

In addition, in another embodiment (not shown), the fastening member includes a base portion extending along the axis line direction, and the first fastening portion and the second fastening portion extending toward the radial inner side along a direction orthogonal to the axis line direction from both end portions of the base portion. According to this embodiment, since the first fastening portion and the second fastening portion are not shaped to be along the back surfaces 62a and 64a of both of the flange portions 62 and 64, it is not necessary to process angles of the first fastening portion and the second fastening portion with respect to the base portion to be adapted to the back surfaces 62a and 64a of both of the flange portions. Therefore, the processing becomes easy.

In one embodiment, as shown in FIG. 6, at one flange portion of the first flange portion 62 and the second flange portion 64, at least one inner protrusion 80 protruding toward the other flange portion of both of the first flange portions 62 and 64 is formed on the radial outer side of the outer peripheral edge portion 68a of the heat-shielding plate 68, and at the other flange portion, at least one outer protrusion 82 whose inner peripheral surface comes into contact with an outer peripheral surface of the inner protrusion 80 is formed on the radial outer side of the inner protrusion 80.

According to the present embodiment, the inner protrusion 80 and the outer protrusion 82 are provided on the radial outer side of the outer peripheral edge portion 68a of the heat-shielding plate 68, and a contact surface is provided where an outer peripheral surface 80a of the inner protrusion 80 and an inner peripheral surface 82a of the outer protrusion 82 come into contact with each other. Since the contact surface forms a seal surface, the sealing performance can be further improved. In addition, the inner protrusion 80 and the outer protrusion 82 are provided, so that axial misalignment between the turbine housing 42 and the bearing housing 38 can be prevented.

In the embodiment shown in FIG. 6, the inner protrusion 80 protrudes toward the first flange portion 62 from the second flange portion 64, and the outer protrusion 82 protrudes toward the second flange portion 64 from the first flange portion 62.

In another embodiment, the inner protrusion 80 may be formed to protrude toward the second flange portion 64 from the first flange portion 62, and the outer protrusion 82 may be formed to protrude toward the first flange portion 62 from the second flange portion 64.

In the embodiment shown in FIG. 6, each of the inner protrusion 80 and the outer protrusion 82 has a rectangular cross section in the first cross section. In addition, the protrusion amount of the inner protrusion 80 has a dimension that is substantially the same as the plate thickness of the outer peripheral edge portion 68a of the heat-shielding plate 68. However, each of the inner protrusion 80 and the outer protrusion 82 may have a cross section other than a rectangular shape in the first cross section.

In one embodiment, as shown in FIG. 6, the outer protrusion 82 is formed in the first flange portion 62. According to this embodiment, since the outer protrusion 82 is formed in the first flange portion 62 and an outer peripheral surface of the outer protrusion 82 is an open surface, the thermal deformation of the outer protrusion 82 due to the heat transmitted to the first flange portion 62 from the side of the rear-side exhaust gas flow path 54 and the front-side exhaust gas flow path 56 is hardly transmitted to the second flange portion 64 side. Therefore, it is possible to suppress a decrease in the sealing performance of the second seal surface S2 on the second flange portion 64 side due to the thermal deformation of the first flange portion 62.

In the embodiment shown in FIG. 6, a protrusion 65 is formed to protrude radially outward from an outer periphery side of the second flange portion 64. The protrusion 65 has an end surface 65b facing an end surface 82b of the outer protrusion 82. The second pressurization surface Ps2 can be widened to the radial outer side by forming the protrusion 65. Accordingly, the fastening force by the second fastening portion 74 can be increased.

In one embodiment, in the cross section (the first cross section) shown in FIG. 6, the radial length of the region (the first seal surface S1) between the first seal outer end So1 and the first seal inner end Si1 is smaller than the radial length of the region (the second seal surface S2) between the second seal outer end So2 and the second seal inner end Si2 (S1<S2).

According to the present embodiment, since the radial length of the first seal surface S1 is smaller than the radial length of the second seal surface S2, the heat amount that is transmitted from the first flange portion 62 to the bearing housing 38 via the outer peripheral edge portion 68a of the heat-shielding plate 68 can be suppressed. Accordingly, since a temperature rise of the bearing housing 38 is suppressed and the thermal deformation of the bearing housing 38 is suppressed, a decrease in the sealing performance of the second seal surface S2 can be suppressed. In addition, since the thermal stress that is generated in the bearing housing 38 due to the temperature rise can also be suppressed, the fatigue life of the bearing housing 38 is also improved. Furthermore, the area of the first seal surface S1 is reduced, so that the contact surface pressure that is applied to the first seal surface S1 per unit area is increased, and thus the sealing performance of the first seal surface S1 can be improved.

Figure 8:
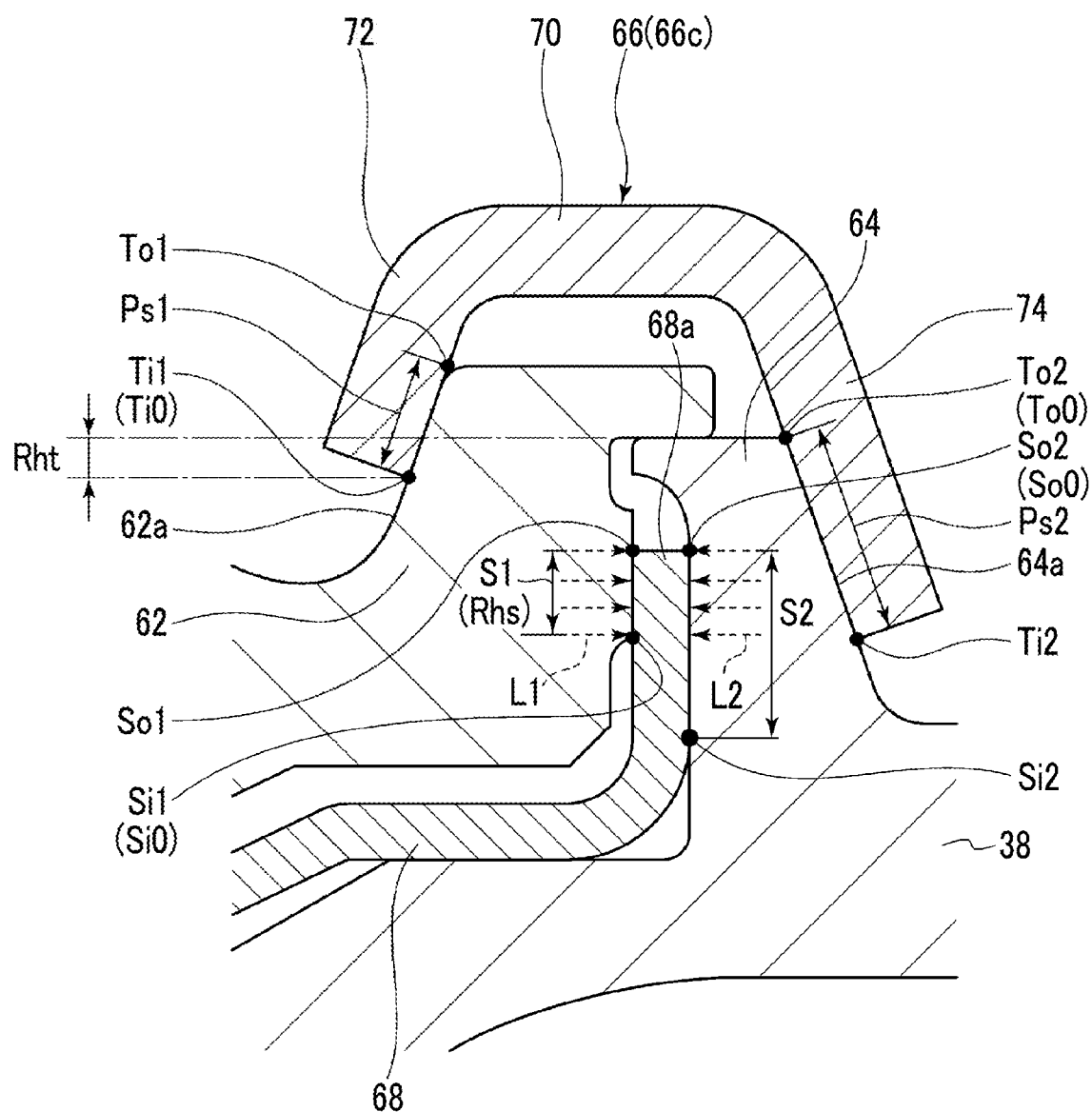
FIG. 8 is a vertical sectional view showing a part of the exhaust turbine portion according to the embodiment in an enlarged manner.

FIG. 8 is a vertical sectional view (the first cross section) showing an exhaust turbine portion 34c according to still another embodiment. In FIG. 8, a point To1 indicates an outermost position (a first fastening outer end) in the radial direction in a contact surface (a first pressurization surface Ps1) between the first fastening portion 72 and the back surface 62a of the first flange portion 62. A point To2 indicates an outermost position (a second fastening outer end) in the radial direction in a contact surface (a second pressurization surface Ps2) between the second fastening portion 74 and the back surface 64a of the second flange portion 64. The fastening outer end which is located on the inner side in the radial direction, of the first fastening outer end To1 and the second fastening outer end To2, is set to be a fastening outer end To0 (in the present embodiment, the second fastening outer end To2 corresponds to the fastening outer end To0). In this case, in a fastening region (a high fastening pressure region Rht) between the fastening inner end TiC and the fastening outer end To0 in the radial direction, an average value At2 of the wall thickness of the second flange portion 64 in the axis line direction is smaller than an average value At1 of the wall thickness of the first flange portion 62 in the axis line direction (At2<At1). The fastening inner end TiC is formed in the first flange portion 62. That is, the second fastening inner end Ti2 is located on the radial inner side with respect to the first fastening inner end Ti1, and the second pressurization surface Ps2 on the second fastening portion 74 side extends to the radial inner side with respect to the first pressurization surface Ps1 on the first fastening portion 72 side.

According to the present embodiment, since (the wall thickness average value At2 of the second flange portion 64)<(the wall thickness average value At1 of the first flange portion 62), when the fastening force of the fastening member 66 is applied to both of the flange portions 62 and 64, the second flange portion 64 is more deformed. Therefore, the second seal surface S2 formed between the second flange portion 64 and the outer peripheral edge portion 68a of the heat-shielding plate 68 is easily subjected to a non-uniform load in the radial direction. However, since the second pressurization surface Ps2 extends to the radial inner side on the second flange portion 64 side, the fastening force of the fastening member 66 is applied to the radial inner side region further than the first flange portion 62. Therefore, the non-uniform load in the radial direction that is applied to the second seal surface S2 on the second flange portion 64 side is offset, so that a substantially uniform load L2 is obtained, and the sealing performance of the second seal surface S2 on the second flange portion 64 side is maintained.

However, in the first flange portion 62, since the first pressurization surface Ps1 does not extend to the radial inner side region like the second pressurization surface Ps2, the fastening force of the fastening member 66 does not reach the radial inner side as in the second flange portion 64. Therefore, a non-uniform load in the radial direction is easily applied to the first seal surface S1. However, since the wall thickness average value At1 of the first flange portion 62 is larger than wall thickness average value At2 of the second flange portion 64, deformation is less likely to occur than in the second flange portion 64. Therefore, such a non-uniform load in the radial direction is not applied to the first seal surface S1 on the first flange portion 62 side, and a uniform load L1 is applied to the first seal surface S1. In this way, since the loads that are applied to the seal surfaces S1 and S2 on the first flange portion 62 side and the second flange portion 64 side are averaged in the radial direction, the sealing performance can be maintained.

In the embodiment shown in FIG. 8, the wall thickness average value At1 of the first flange portion 62 is larger than the wall thickness average value At2 of the second flange portion 64, and the fastening inner end TiC is present in the first flange portion 62. However, in another embodiment, the wall thickness average value At2 of the second flange portion 64 may be larger than the wall thickness average value At1 of the first flange portion 62, and the fastening inner end TiC may be present in the second flange portion 64.

In one embodiment, as shown in FIG. 3, a distance Ra along the radial direction between the center of the rotating shaft 36 and the rear-side tongue portion 58 and a distance Rb along the radial direction between the central axis O of the rotating shaft 36 and the seal inner end SiC are configured to satisfy a relationship of $1.1 Ra \leq Rb$.

According to this embodiment, since each of the seal surfaces S1 and S2 is sufficiently separated from the rear-side tongue portion 58 to the radial outer side, the seal surfaces S1 and S2 are substantially not affected by the non-uniform thermal deformation of the rear-side tongue portion 58. Therefore, the sealing performance of the seal surfaces S1 and S2 can be maintained.

In one embodiment, in the cross section (the first cross section) shown in FIG. 6, the turbine housing 42 includes an extension portion 90 extending along the axis line direction from an outer peripheral surface of the scroll portion 44 toward the first flange portion 62. In the first cross section, a wall thickness t1 of a minimum wall thickness portion 92 in which the wall thickness in the radial direction of the extension portion 90 is the minimum wall thickness, and a distance t2 along the axis line direction between the minimum wall thickness portion 92 and the first seal inner end Si1 are configured to satisfy a relationship of $t1 \leq t2$. When the heat flux that is generated by the heat that is transmitted from the exhaust gas e to the turbine housing 42 flows through the extension portion 90, the heat flux having the highest density per unit area flows through the minimum wall thickness portion 92.

According to the present embodiment, since there is the relationship of $t1 \leq t2$ and the first seal surface S1 is separated in distance from the minimum wall thickness portion 92, the first seal surface S1 is less likely to be affected by the non-uniform thermal deformation of the rear-side tongue portion 58. Therefore, the sealing performance of the first seal surface S1 can be maintained.

The contents described in each of the embodiments described above are understood as follows, for example.

(1) An exhaust turbine according to an aspect includes: a rotating shaft (36); a turbine wheel (40) mounted on one end side of the rotating shaft (36); a turbine housing (42) which accommodates the turbine wheel (40), and in which a scroll portion (44) that introduces an exhaust gas (e) to the turbine wheel (40) is formed on an outer periphery side of the turbine wheel (40); a bearing housing (38) which accommodates a bearing (52) that supports the rotating shaft (36), and which is provided adjacent to the turbine housing (42); a fastening member (66) for fastening a first flange portion (62) of the turbine housing (42) and a second flange portion (64) of the bearing housing (38) to each other; and a heat-shielding plate (68) that is disposed between the turbine housing (42) and the bearing housing (38) and that has an outer peripheral edge portion (68a) sandwiched between the first flange portion (62) and the second flange portion (64), in which in a first cross section along an axis line direction of the rotating shaft (36), which passes through a center (O) of the rotating shaft (36) and a tongue portion (58) of the turbine housing (42), in a case where an innermost position in a radial direction of the rotating shaft (36) in a contact surface (S1) between the first flange portion (62) and the outer peripheral edge portion (68a) of the heat-shielding plate (68) is set to be a first seal inner end (Si1), an innermost position in the radial direction in a contact surface (S2) between the second flange portion (64) and the outer peripheral edge portion (68a) of the heat-shielding plate (68) is set to be a second seal inner end (Si2), and the seal inner end which is located on an outer side in the radial direction, of the first seal inner end (Si1) and the second seal inner end (Si2), is set to be a seal inner end (SiC), the seal inner end (SiC) is disposed on an outer side with respect to the tongue portion (58) in the radial direction.

According to such a configuration, the seal inner end (SiC) (an inner end of a radial region where each of the seal surfaces (S1, S2) is formed on each of both surfaces of the outer peripheral edge portion (68*a*) of the heat-shielding plate (68) between the outer peripheral edge portion (68*a*) of the heat-shielding plate (68) and each of the flange portions (62, 64)) that is located on the outer side in the radial direction of the rotating shaft (36), of the first seal inner end (Si1) and the second seal inner end (Si2), is disposed on the radial outer side with respect to the tongue portion (58). Therefore, the seal surfaces (S1, S2) are formed on both surfaces of the outer peripheral edge portion (68*a*) of the heat-shielding plate (68), and the radial region where the sealing performance is most exhibited is located at a position separated to the radial outer side from the portion that is affected by the non-uniform thermal deformation of the tongue portion (58). Accordingly, since the seal surfaces (S1, S2) formed on the outer peripheral edge portion (68*a*) of the heat-shielding plate (68) can be prevented from being affected by the non-uniform thermal deformation of the tongue portion (58), the sealing performance of the heat-shielding plate (68) can be maintained.

(2) In an exhaust turbine according to another aspect, in the exhaust turbine according to the above (1), the fastening member (66) includes a base portion (70) that is disposed on an outer periphery side of the first flange portion (62) and the second flange portion (64), a first fastening portion (72) extending from the base portion (70) toward an inner side in the radial direction along a back surface (62*a*) of the first flange portion (62), and a second fastening portion (74) extending from the base portion (70) toward the inner side in the radial direction along a back surface (64*a*) of the second flange portion (64), and in the first cross section, in a case where an outermost position in the radial direction in the contact surface (S1) between the first flange portion (62) and the outer peripheral edge portion (68*a*) of the heat-shielding plate (68) is set to be a first seal outer end (So1), an outermost position in the radial direction in the contact surface (S2) between the second flange portion (64) and the outer peripheral edge portion (68*a*) of the heat-shielding plate (68) is set to be a second seal outer end (So2), the seal outer end which is located on the inner side in the radial direction, of the first seal outer end (So1) and the second seal outer end (So2), is set to be a seal outer end (So0), an innermost position in the radial direction in a contact surface (S1) between the first fastening portion (72) and the back surface (62*a*) of the first flange portion (62) is set to be a first fastening inner end (Ti1), an innermost position in the radial direction in a contact surface (S2) between the second fastening portion (74) and the back surface (64*a*) of the second flange portion (64) is set to be a second fastening inner end (Ti2), and a fastening inner end which is located on the outer side in the radial direction, of the first fastening inner end (Ti1) and the second fastening inner end (Ti2), is set to be a fastening inner end (Ti0), the seal outer end (So0) is disposed on an inner side with respect to the fastening inner end (Ti0) in the radial direction.

According to such a configuration, the seal outer end (So0) (an outer end in the radial region where each of the seal surfaces (S1, S2) is formed on each of both surfaces of the outer peripheral edge portion (68*a*) of the heat-shielding plate (68) between the outer peripheral edge portion (68*a*) of the heat-shielding plate (68) and both of the flange portions (62, 64)) is disposed on the radial inner side with respect to the fastening inner end (Ti0) (the inner end in the radial region where the fastening force is applied to each of the flange portions (62, 64) from each of the first fastening portion (72) and the second fastening portion (74)). Therefore, the seal region (Rhs) where the sealing performance of the heat-shielding plate (68) is most exhibited in the radial direction is located at a position separated from the region (Rht) where both of the flange portions (62, 64) receive the most fastening force from the fastening member (66). Accordingly, even in a case where the fastening force of the fastening member (66) that is applied to both of the flange portions (62, 64) is biased in the circumferential direction of the rotating shaft (36), since the bias in the circumferential direction of the fastening force that is applied to the seal region (Rhs) is mitigated, the sealing performance of both of the seal surfaces (S1, S2) can be ensured.

(3) In an exhaust turbine according to a still another aspect, in the exhaust turbine according to the above (1) or (2), at one flange portion of the first flange portion (62) and the second flange portion (64), at least one inner protrusion (80) that protrudes toward the other flange portion of the first flange portion (62) and the second flange portion (64) is formed on an outer side of the outer peripheral edge portion (68*a*) of the heat-shielding plate (68) in the radial direction, and at the other flange portion, at least one outer protrusion (82) having an inner peripheral surface (82*a*) that comes into contact with an outer peripheral surface (80*a*) of the inner protrusion (80) is formed on an outer side of the inner protrusion (80) in the radial direction.

According to such a configuration, the inner protrusion (80) and the outer protrusion (82) are formed on the radial outer side of the outer peripheral edge portion (68*a*) of the heat-shielding plate (68), and the sealing performance can be improved due to the presence of these concave and convex portions. Therefore, the sealing performance between the first flange portion (62) and the second flange portion (64) is improved. In addition, since the turbine housing (42) and the bearing housing (38) are positioned in the radial direction by the inner protrusion (80) and the outer protrusion (82), it is possible to prevent the axial misalignment between these housings.

(4) In an exhaust turbine according to a still another aspect, in the exhaust turbine according to the above (3), the at least one outer protrusion (82) is formed in the first flange portion (62).

According to such a configuration, since at least one outer protrusion (82) is formed in the first flange portion (62), even when the outer protrusion (82) is thermally deformed due to the heat of the exhaust gas (e), the bearing housing (38) is not affected by the thermal deformation of the outer protrusion (82). Therefore, the influence of the thermal deformation of the turbine housing (42) on the bearing housing (38) is mitigated, so that a decrease in the sealing performance of the seal surface (S2) that is formed between the second flange portion (64) on the bearing housing (38) side and the heat-shielding plate (68) is suppressed.

(5) In an exhaust turbine according to a still another aspect, in the exhaust turbine according to any one of the above (1) to (4), in the first cross section, a length of the contact surface (S1) between the first flange portion (62) and the outer peripheral edge portion (68*a*) of the heat-shielding plate (68) is smaller than a length of the contact surface (S2) between the second flange portion (64) and the outer peripheral edge portion (68a) of the heat-shielding plate (68).

According to such a configuration, since the area of the contact surface (S1) between the first flange portion (62) and the outer peripheral edge portion (68a) of the heat-shielding plate (68) is smaller than the area of the contact surface (S2) between the second flange portion (64) and the outer peripheral edge portion (68a) of the heat-shielding plate (68), the heat transmission from the first flange portion (62) to the bearing housing (38) via the outer peripheral edge portion (68a) of the heat-shielding plate (68) is suppressed. Accordingly, since the temperature rise of the bearing housing (38) is suppressed and the thermal deformation of the bearing housing (38) is suppressed, a decrease in sealing performance between the heat-shielding plate (68) and the second flange portion (64) can be suppressed. In addition, since the thermal stress that is generated in the bearing housing (38) due to the temperature rise is also suppressed, the fatigue life of the bearing housing (38) is also improved.

(6) In an exhaust turbine according to a still another aspect, in the exhaust turbine according to the above (2), in the first cross section, in a case where an outermost position in the radial direction in a contact surface (Ps1) between the first fastening portion (72) and a back surface (62a) of the first flange portion (62) is set to be a first fastening outer end (To1), an outermost position in the radial direction in a contact surface (Ps2) between the second fastening portion (74) and a back surface (64a) of the second flange portion (64) is set to be a second fastening outer end (To2), a the fastening outer end which is located on the inner side in the radial direction, of the first fastening outer end (To1) and the second fastening outer end (To2), is set to be a fastening outer end (To0), in a fastening region (Rht) between the fastening inner end (Ti0) and the fastening outer end (To0) in the radial direction, an average value (At) of a wall thickness in the axis line direction (O) of one flange portion of the first flange portion (62) and the second flange portion (64) is smaller than an average value (At) of a wall thickness in the axis line direction (O) of the other flange portion of the first flange portion (62) and the second flange portion (64), and the fastening inner end (Ti0) is formed in the other flange portion.

According to such a configuration, in the fastening region (Rht) (the region where the fastening force is applied to the outer peripheral edge portion (68a) of the heat-shielding plate (68) from both sides of the first fastening portion (72) and the second fastening portion (74) in the radial direction), since the wall thickness average value (At) in the axis line direction of one flange portion of the first flange portion (62) and the second flange portion (64) is smaller than the wall thickness average value (At) of the other flange portion, one flange portion is more deformed than the other flange portion by the fastening force of the fastening member (66). Therefore, a non-uniform load in the radial direction is likely to be applied to the seal surface formed between one flange portion and the outer peripheral edge portion (68a) of the heat-shielding plate (68). However, since the fastening inner end (Ti0) is formed in the other flange portion, the fastening force that is applied to one flange portion reaches the radial inner side with respect to the other flange portion. Therefore, the non-uniform load in the radial direction which is applied to the seal surface on one flange portion side is offset, and the sealing performance of the seal surface on one flange portion side is maintained.

In contrast, since the other flange portion is formed with the fastening inner end (Ti0), the radial inner end of the region where the fastening force of the fastening member (66) is exerted on the other flange portion side is located outside the radial inner end of the region where the fastening force of the fastening member (66) is exerted on one flange portion. Therefore, a non-uniform load in the radial direction is easily applied to the seal surface formed between the other flange portion and the outer peripheral edge portion (68a) of the heat-shielding plate (68) from the fastening member (66). However, since the wall thickness average value (At) of the other flange portion in the axis line direction is larger than the wall thickness average value (At) of one flange portion, the deformation of the other flange portion due to the fastening force that is applied from the fastening member (66) is less likely to occur than in one flange portion. Therefore, the sealing performance of the seal surface on the other flange portion side is ensured.

(7) In an exhaust turbine according to a still another aspect, in the exhaust turbine according to any one of the above (1) to (6), in the first cross section, a distance Ra in the radial direction between the center of the rotating shaft (36) and the tongue portion (58) and a distance Rb in the radial direction between the center (O) of the rotating shaft (36) and the seal inner end (SiC) satisfy a relationship of $1.1Ra \leq Rb$.

According to such a configuration, since each of the seal surfaces (S1, S2) that are formed between the first flange portion (62) and the second flange portion (64), and the outer peripheral edge portion (68a) of the heat-shielding plate (68) is located at a position sufficiently separated outward from the tongue portion (58) in the radial direction, the seal surfaces (S1, S2) are substantially not affected by the non-uniform thermal deformation of the tongue portion (58). Therefore, the sealing performance of the seal surfaces (S1, S2) can be maintained.

(8) In an exhaust turbine according to a still another aspect, in the exhaust turbine according to any one of the above (1) to (7), the turbine housing (42) includes an extension portion (90) that extends from an outer peripheral surface of the scroll portion (44) toward the first flange portion (62) along the axis line direction (O), and in the first cross section, a wall thickness t1 of a minimum wall thickness portion (92) in which a wall thickness in the radial direction of the extension portion (90) is a minimum wall thickness and a distance t2 along the axis line direction (O) between the minimum wall thickness portion (92) and the first seal inner end (Si1) satisfy a relationship of $t1 \leq t2$.

The heat flux that is generated in the turbine housing (42) due to the heat that is transmitted from the exhaust gas (e) to the turbine housing (42) has the highest density per unit area in the minimum wall thickness portion (92). According to the above configuration, since the distance t2 in the axis line direction between the minimum wall thickness portion (92) and the second seal inner end (Si2) is equal to or greater than the wall thickness t1 of the minimum wall thickness portion (92), the seal surface (S1) that is formed between the first flange portion (62) and the outer peripheral edge portion (68a) of the heat-shielding plate (68) is less likely to be affected by the non-uniform thermal deformation of the tongue portion (58), and the sealing performance can be maintained.

(9) A supercharger according to still another aspect further includes: the exhaust turbine (34) according to any one of the above (1) to (8); a compressor wheel (32b) mounted on the other end side of the rotating shaft (36)

via the bearing housing (38) with respect to the turbine wheel (40); and a compressor housing (32a) that accommodates the compressor wheel (32b).

According to such a configuration, since the exhaust turbine (34) according to any one of the above (1) to (8) is provided, even when non-uniform thermal deformation occurs in the vicinity of the tongue portion (58) formed in the turbine housing (42) through which the exhaust gas (e) flows due to the heat of the exhaust gas (e), the sealing performance of each of the seal surfaces (S1, S2) formed between the first flange portion (62) of the turbine housing (42) and the second flange portion (64) of the bearing housing (38), and the heat-shielding plate (68) can be maintained at a high level.

REFERENCE SIGNS LIST

10: engine
12a, 12b, 12c, 12d: cylinder
14: engine main body
16: air supply pipe
18: air supply manifold
20: exhaust manifold
22: exhaust pipe
30: supercharger
32: compressor portion
32a: compressor housing
32b: compressor wheel
34 (34a, 34b, 34c): exhaust turbine portion
36: rotating shaft
38: bearing housing
40: turbine wheel
42: turbine housing
44: scroll portion
45: partition wall
45a: partition wall surface
46: exhaust gas introduction portion
48: blade
50: exhaust gas introduction passage
52: bearing
54: rear-side exhaust gas flow path
56: front-side exhaust gas flow path
54a: partition wall surface
58: rear-side tongue portion
59: downstream-side end
60: front-side tongue portion
62: first flange portion
62a: back surface
64: second flange portion
64a: back surface
65: protrusion
65b: end surface
66 (66a, 66b, 66c): fastening member
68: heat-shielding plate
68a: outer peripheral edge portion
70 (70a, 70b): base portion
72: first fastening portion
74: second fastening portion
80: inner protrusion
80a: outer peripheral surface
82: outer protrusion
82a: inner peripheral surface
82b: end surface
90: extension portion
92: minimum wall thickness portion
L1, L2: load
D: lower portion of tongue portion
M: midpoint
O: central axis
Ps1: first pressurization surface
Ps2: second pressurization surface
Rhs: high seal pressure region
Rht: high fastening pressure region
S1: first seal surface
S2: second seal surface
Si1: first seal inner end
Si2: second seal inner end
Si0: seal inner end
So1: first seal outer end
So2: second seal outer end
So0: seal outer end
Ti1: first fastening inner end
Ti2: second fastening inner end
Ti0: fastening inner end
Tn: reference line of tongue portion
To1: first fastening outer end
To2: second fastening outer end
To0: fastening outer end
a: air for fuel

The invention claimed is:
1. An exhaust turbine comprising:
a rotating shaft;
a turbine wheel mounted on one end side of the rotating shaft;
a turbine housing which accommodates the turbine wheel, and in which a scroll portion that introduces an exhaust gas to the turbine wheel is formed on an outer periphery side of the turbine wheel;
a bearing housing which accommodates a bearing that supports the rotating shaft, and which is provided adjacent to the turbine housing;
a fastening member for fastening a first flange portion of the turbine housing and a second flange portion of the bearing housing to each other; and
a heat-shielding plate that is disposed between the turbine housing and the bearing housing and that has an outer peripheral edge portion sandwiched between the first flange portion and the second flange portion,
wherein in a first cross section along an axis line direction of the rotating shaft, which passes through a center of the rotating shaft and a tongue portion of the turbine housing, in a case where an innermost position in a radial direction of the rotating shaft in a contact surface between the first flange portion and the outer peripheral edge portion of the heat-shielding plate is set to be a first seal inner end, an innermost position in the radial direction in a contact surface between the second flange portion and the outer peripheral edge portion of the heat-shielding plate is set to be a second seal inner end, and a seal inner end which is located on an outer side in the radial direction, of the first seal inner end and the second seal inner end, is set to be the e-seal inner end, the seal inner end is disposed on an outer side with respect to the tongue portion in the radial direction, and
in the first cross section, a first seal outer end, which is an outermost position in the radial direction in a contact surface between the first flange portion and the outer peripheral edge portion of the head shielding plate, is configured to be located on an outer side in the radial direction with respect to an innermost position in the radial direction in a concave portion formed between the scroll portion and the first flange portion.

2. An exhaust turbine comprising:
a rotating shaft;
a turbine wheel mounted on one end side of the rotating shaft;
a turbine housing which accommodates the turbine wheel, and in which a scroll portion that introduces an exhaust gas to the turbine wheel is formed on an outer periphery side of the turbine wheel;
a bearing housing which accommodates a bearing that supports the rotating shaft, and which is provided adjacent to the turbine housing;
a fastening member for fastening a first flange portion of the turbine housing and a second flange portion of the bearing housing to each other; and
a heat-shielding plate that is disposed between the turbine housing and the bearing housing and that has an outer peripheral edge portion sandwiched between the first flange portion and the second flange portion,
wherein in a first cross section along an axis line direction of the rotating shaft, which passes through a center of the rotating shaft and a tongue portion of the turbine housing, in a case where an innermost position in a radial direction of the rotating shaft in a contact surface between the first flange portion and the outer peripheral edge portion of the heat-shielding plate is set to be a first seal inner end, an innermost position in the radial direction in a contact surface between the second flange portion and the outer peripheral edge portion of the heat-shielding plate is set to be a second seal inner end, and a seal inner end which is located on an outer side in the radial direction, of the first seal inner end and the second seal inner end, is set to be the seal inner end, the seal inner end is disposed on an outer side with respect to the tongue portion in the radial direction,
wherein the fastening member includes
a base portion that is disposed on an outer periphery side of the first flange portion and the second flange portion,
a first fastening portion extending from the base portion toward an inner side in the radial direction along a back surface of the first flange portion, and
a second fastening portion extending from the base portion toward the inner side in the radial direction along a back surface of the second flange portion, and
in the first cross section, in a case where an outermost position in the radial direction in the contact surface between the first flange portion and the outer peripheral edge portion of the heat-shielding plate is set to be a first seal outer end, an outermost position in the radial direction in the contact surface between the second flange portion and the outer peripheral edge portion of the heat-shielding plate is set to be a second seal outer end, a seal outer end which is located on the inner side in the radial direction, of the first seal outer end and the second seal outer end, is set to be a seal outer end, an innermost position in the radial direction in a contact surface between the first fastening portion and the back surface of the first flange portion is set to be a first fastening inner end, an innermost position in the radial direction in a contact surface between the second fastening portion and the back surface of the second flange portion is set to be a second fastening inner end, and a fastening inner end which is located on the outer side in the radial direction, of the first fastening inner end and the second fastening inner end, is set to be a fastening inner end,
the seal outer end is disposed on an inner side with respect to the fastening inner end in the radial direction.

3. The exhaust turbine according to claim 1,
wherein at one flange portion of the first flange portion and the second flange portion, at least one inner protrusion that protrudes toward the other flange portion of the first flange portion and the second flange portion is formed on an outer side of the outer peripheral edge portion of the heat-shielding plate in the radial direction, and at the other flange portion, at least one outer protrusion having an inner peripheral surface that comes into contact with an outer peripheral surface of the inner protrusion is formed on an outer side of the inner protrusion in the radial direction.

4. The exhaust turbine according to claim 3,
wherein the at least one outer protrusion is formed in the first flange portion.

5. The exhaust turbine according to claim 1,
wherein in the first cross section, a length of the contact surface between the first flange portion and the outer peripheral edge portion of the heat-shielding plate is smaller than a length of the contact surface between the second flange portion and the outer peripheral edge portion of the heat-shielding plate.

6. The exhaust turbine according to claim 1,
wherein in the first cross section, in a case where an outermost position in the radial direction in a contact surface between the first fastening portion and a back surface of the first flange portion is set to be a first fastening outer end, an outermost position in the radial direction in a contact surface between the second fastening portion and a back surface of the second flange portion is set to be a second fastening outer end, and a fastening outer end which is located on the inner side in the radial direction, of the first fastening outer end and the second fastening outer end, is set to be a fastening outer end,
in a fastening region between the fastening inner end and the fastening outer end in the radial direction, an average value of a wall thickness in the axis line direction of one flange portion of the first flange portion and the second flange portion is smaller than an average value of a wall thickness in the axis line direction of the other flange portion of the first flange portion and the second flange portion, and
the fastening inner end is formed in the other flange portion.

7. An exhaust turbine comprising:
a rotating shaft;
a turbine wheel mounted on one end side of the rotating shaft;
a turbine housing which accommodates the turbine wheel, and in which a scroll portion that introduces an exhaust gas to the turbine wheel is formed on an outer periphery side of the turbine wheel;
a bearing housing which accommodates a bearing that supports the rotating shaft, and which is provided adjacent to the turbine housing;
a fastening member for fastening a first flange portion of the turbine housing and a second flange portion of the bearing housing to each other; and
a heat-shielding plate that is disposed between the turbine housing and the bearing housing and that has an outer peripheral edge portion sandwiched between the first flange portion and the second flange portion,
wherein in a first cross section along an axis line direction of the rotating shaft, which passes through a center of the rotating shaft and a tongue portion of the turbine housing, in a case where an innermost position in a radial direction of the rotating shaft in a contact surface between the first flange portion and the outer peripheral edge portion of the heat-shielding plate is set to be a first seal inner end, an innermost position in the radial direction in a contact surface between the second flange portion and the outer peripheral edge portion of the heat-shielding plate is set to be a second seal inner end, and a seal inner end which is located on an outer side in the radial direction, of the first seal inner end and the second seal inner end, is set to be the seal inner end, the seal inner end is disposed on an outer side with respect to the tongue portion in the radial direction, wherein in the first cross section, a distance Ra in the radial direction between the center of the rotating shaft and the tongue portion and a distance Rb in the radial direction between the center of the rotating shaft and the seal inner end satisfy a relationship of 1.1Ra≤Rb.

8. An exhaust turbine comprising:

a rotating shaft;

a turbine wheel mounted on one end side of the rotating shaft;

a turbine housing which accommodates the turbine wheel, and in which a scroll portion that introduces an exhaust gas to the turbine wheel is formed on an outer periphery side of the turbine wheel;

a bearing housing which accommodates a bearing that supports the rotating shaft, and which is provided adjacent to the turbine housing;

a fastening member for fastening a first flange portion of the turbine housing and a second flange portion of the bearing housing to each other; and a heat-shielding plate that is disposed between the turbine housing and the bearing housing and that has an outer peripheral edge portion sandwiched between the first flange portion and the second flange portion, wherein in a first cross section along an axis line direction of the rotating shaft, which passes through a center of the rotating shaft and a tongue portion of the turbine housing, in a case where an innermost position in a radial direction of the rotating shaft in a contact surface between the first flange portion and the outer peripheral edge portion of the heat-shielding plate is set to be a first seal inner end, an innermost position in the radial direction in a contact surface between the second flange portion and the outer peripheral edge portion of the heat-shielding plate is set to be a second seal inner end, and a seal inner end which is located on an outer side in the radial direction, of the first seal inner end and the second seal inner end, is set to be the seal inner end, the seal inner end is disposed on an outer side with respect to the tongue portion in the radial direction, wherein the turbine housing includes an extension portion that extends from an outer peripheral surface of the scroll portion toward the first flange portion along the axis line direction, and in the first cross section, a wall thickness t1 of a minimum wall thickness portion in which a wall thickness in the radial direction of the extension portion is a minimum wall thickness and a distance t2 along the axis line direction between the minimum wall thickness portion and the first seal inner end satisfy a relationship of t1≤t2.

9. A supercharger further comprising:

the exhaust turbine according to claim 1;

a compressor wheel mounted on the other end side of the rotating shaft via the bearing housing with respect to the turbine wheel; and a compressor housing that accommodates the compressor wheel.

10. A supercharger further comprising:

the exhaust turbine according to claim 2;

a compressor wheel mounted on the other end side of the rotating shaft via the bearing housing with respect to the turbine wheel; and a compressor housing that accommodates the compressor wheel.

11. A supercharger further comprising:

the exhaust turbine according to claim 7;

a compressor wheel mounted on the other end side of the rotating shaft via the bearing housing with respect to the turbine wheel; and a compressor housing that accommodates the compressor wheel.

12. A supercharger further comprising:

the exhaust turbine according to claim 8;

a compressor wheel mounted on the other end side of the rotating shaft via the bearing housing with respect to the turbine wheel; and a compressor housing that accommodates the compressor wheel.

* * * * *